(12) United States Patent
Muralidhar et al.

(10) Patent No.: US 9,829,963 B2
(45) Date of Patent: *Nov. 28, 2017

(54) FRAMEWORK FOR RUNTIME POWER MONITORING AND MANAGEMENT

(71) Applicant: Intel Corporation, Santa Clara, CA (US)

(72) Inventors: Rajeev D. Muralidhar, Bangalore (IN); Harinarayanan Seshadri, Bangalore (IN); Nithish Mahalingam, Chennai (IN); Rushikesh S. Kadam, Bangalore (IN); Vishwesh M. Rudramuni, Bangalore (IN); Sujith Thomas, Bangalore (IN)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/583,296

(22) Filed: Dec. 26, 2014

(65) Prior Publication Data

US 2015/0121114 A1 Apr. 30, 2015

Related U.S. Application Data

(63) Continuation of application No. 13/071,877, filed on Mar. 25, 2011, now Pat. No. 9,152,218.

(30) Foreign Application Priority Data

Dec. 22, 2010 (IN) .......................... 3068/DEL/2010

(51) Int. Cl.
*G06F 9/46* (2006.01)
*G06F 1/00* (2006.01)
(Continued)

(52) U.S. Cl.
CPC ................ *G06F 1/329* (2013.01); *G06F 1/28* (2013.01); *G06F 1/3206* (2013.01); *G06F 9/5094* (2013.01); *Y02B 60/144* (2013.01)

(58) Field of Classification Search
None
See application file for complete search history.

(56) References Cited

U.S. PATENT DOCUMENTS 7,039,755 B1   5/2006   Helms
7,243,243 B2   7/2007   Gedeon
(Continued)

FOREIGN PATENT DOCUMENTS

CN   101765876 A   6/2010
CN   103282855 A   9/2013
(Continued)

OTHER PUBLICATIONS

International Preliminary Report on Patentability received for PCT Patent Application No. PCT/US2011/061272, dated Jul. 4, 2013, 6 pages.
(Continued)

*Primary Examiner* — Tammy Lee
(74) *Attorney, Agent, or Firm* — Jordan IP Law, LLC

(57) ABSTRACT

Systems and methods of managing power in a computing platform may involve monitoring a runtime power consumption of two or more of a plurality of hardware components in the platform to obtain a plurality of runtime power determinations. The method can also include exposing one or more of the plurality of runtime power determinations to an operating system associated with the platform.

14 Claims, 2 Drawing Sheets

(51) Int. Cl.
*G06F 1/32* (2006.01)
*G06F 9/50* (2006.01)
*G06F 1/28* (2006.01)

(56) References Cited

U.S. PATENT DOCUMENTS

| | | |
|---|---|---|
| 8,055,916 B2 | 11/2011 | McDonald et al. |
| 9,152,218 B2 | 10/2015 | Muralidhar et al. |
| 2005/0071690 A1 | 3/2005 | Pomaranski et al. |
| 2006/0107262 A1 | 5/2006 | Bodas et al. |
| 2006/0190745 A1 | 8/2006 | Matsushima et al. |
| 2007/0005996 A1 | 1/2007 | Nalawadi et al. |
| 2007/0028130 A1* | 2/2007 | Schumacher ......... G06F 1/3215 713/320 |
| 2008/0046707 A1 | 2/2008 | Hirai et al. |
| 2008/0168285 A1 | 7/2008 | de Cesare et al. |
| 2008/0238655 A1 | 10/2008 | McShane et al. |
| 2009/0007128 A1 | 1/2009 | Borghetti et al. |
| 2009/0083557 A1 | 3/2009 | Ichikawa et al. |
| 2009/0287433 A1 | 11/2009 | Houston et al. |
| 2009/0327785 A1* | 12/2009 | Chang et al. ................ 713/340 |
| 2010/0115259 A1* | 5/2010 | Elsila .................... G06F 1/3203 713/100 |
| 2010/0188385 A1 | 7/2010 | Boiko |
| 2010/0235840 A1 | 9/2010 | Angaluri |
| 2010/0313203 A1 | 12/2010 | Dawson et al. |
| 2011/0040990 A1* | 2/2011 | Chan ........................ G06F 1/28 713/300 |
| 2011/0055613 A1 | 3/2011 | Mandyam |
| 2011/0066869 A1 | 3/2011 | Wakrat et al. |
| 2011/0078466 A1 | 3/2011 | Cepulis |
| 2012/0005683 A1 | 1/2012 | Bower et al. |
| 2012/0072738 A1 | 3/2012 | Bushue et al. |
| 2012/0167109 A1 | 6/2012 | Muralidhar et al. |
| 2013/0132759 A1* | 5/2013 | Lathrop et al. ............... 713/340 |

FOREIGN PATENT DOCUMENTS

| | | |
|---|---|---|
| EP | 2656174 A2 | 10/2013 |
| TW | 200422810 A | 11/2004 |
| TW | 201232268 A | 8/2012 |
| WO | 2012087463 A2 | 6/2012 |

OTHER PUBLICATIONS

International Search Report and Written Opinion received for PCT Application No. PCT/US2011/061272, dated Jun. 13, 2012, 9 pages.

Notice of Allowance for U.S. Appl. No. 13/071,877, dated May 28, 2015, 11 pages, U.S. Patent and Trademark Office.

Non-Final Office Action for U.S. Appl. No. 13/071,877, dated Feb. 28, 2013, pages, U.S. Patent and Trademark Office.

Final Office Action for U.S. Appl. No. 13/071,877, dated Oct. 25, 2013, pages, U.S. Patent and Trademark Office.

Non-Final Office Action for U.S. Appl. No. 13/071,877, dated Dec. 18, 2014, pages, U.S. Patent and Trademark Office.

Office Action for Chinese Patent Application No. 201180061517.6, dated Apr. 3, 2015, 21 pages including 12 pages of English translation.

European Search Report for EP Patent Application No. 11851644.2, dated Sep. 7, 2016, 7 pages.

Takanori Watanabe, "ACPI Implementation on FreeBSD", Proceedings of te FREENIX Track: 2002 USENIX Annual Technical Conference, Jun. 10-15, 2002, 12 pages, Monterey, California.

Notice of Allowance for Taiwanese Patent Application No. 100142925, dated May 20, 2016, 3 pages with 1 page of English translation.

\* cited by examiner

FRAMEWORK FOR RUNTIME POWER MONITORING AND MANAGEMENT

CROSS-REFERENCE TO RELATED APPLICATIONS

The present application is a continuation of U.S. patent application Ser. No. 13/071,877 filed Mar. 25, 2011.

BACKGROUND

Technical Field

Embodiments generally relate to the monitoring and management of power consumption in computing platforms. In particular, embodiments relate to operating system runtime techniques for determining transient power at a hardware component level.

Discussion

Conventional power management techniques for computing platforms may include operating system (OS) battery monitoring and energy profiling solutions that provide for generic functionality adjustments (e.g., disabling audio/CD/DVD, dimming displays) to extend battery life. These approaches are typically triggered by low battery life conditions and can therefore effectively involve decision making with limited information and granularity. For example, battery consumption determinations may not provide sufficient information regarding individual hardware components to make appropriate power management decisions at the OS level.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may include an apparatus having logic to monitor a runtime power consumption of two or more of a plurality of hardware components in a platform to obtain a plurality of runtime power determinations. The logic can also expose one or more of the plurality of runtime power determinations to an operating system associated with the platform.

Embodiments may also include a non-transitory computer readable storage medium including a set of stored instructions which, if executed by a processor, cause a computer to identify a plurality of runtime power determinations, wherein two or more of the runtime power determinations are to correspond to a hardware component of a platform. The instructions can also assign relative priorities to one or more processes based on the plurality of runtime power determinations, and schedule the one or more processes based on the relative priorities.

Other embodiments can include a computing system having a plurality of hardware components, wherein at least one of the hardware components is a processor, and logic to monitor a runtime power consumption of two or more of the plurality of hardware components to obtain a plurality of runtime power determinations. The logic may also expose one or more of the plurality of runtime power determinations to an operating system associated with the computing system. In addition, the computing system can include a non-transitory computer readable storage medium having a set of stored operating system instructions which, if executed by the processor, cause the computing system to identify the plurality of runtime determinations and map the plurality of runtime determinations to one or more processes. The instructions may also assign relative priorities to the one or more processes based on the plurality of runtime power determinations and schedule the one or more processes based on the relative priorities.

Other embodiments may involve a method in which a runtime power consumption of two or more of a plurality of hardware components in a platform is monitored to obtain a plurality of runtime power determinations. The method can also provide for exposing one or more of the plurality of runtime power determinations to an operating system associated with the platform.

Figure 1:
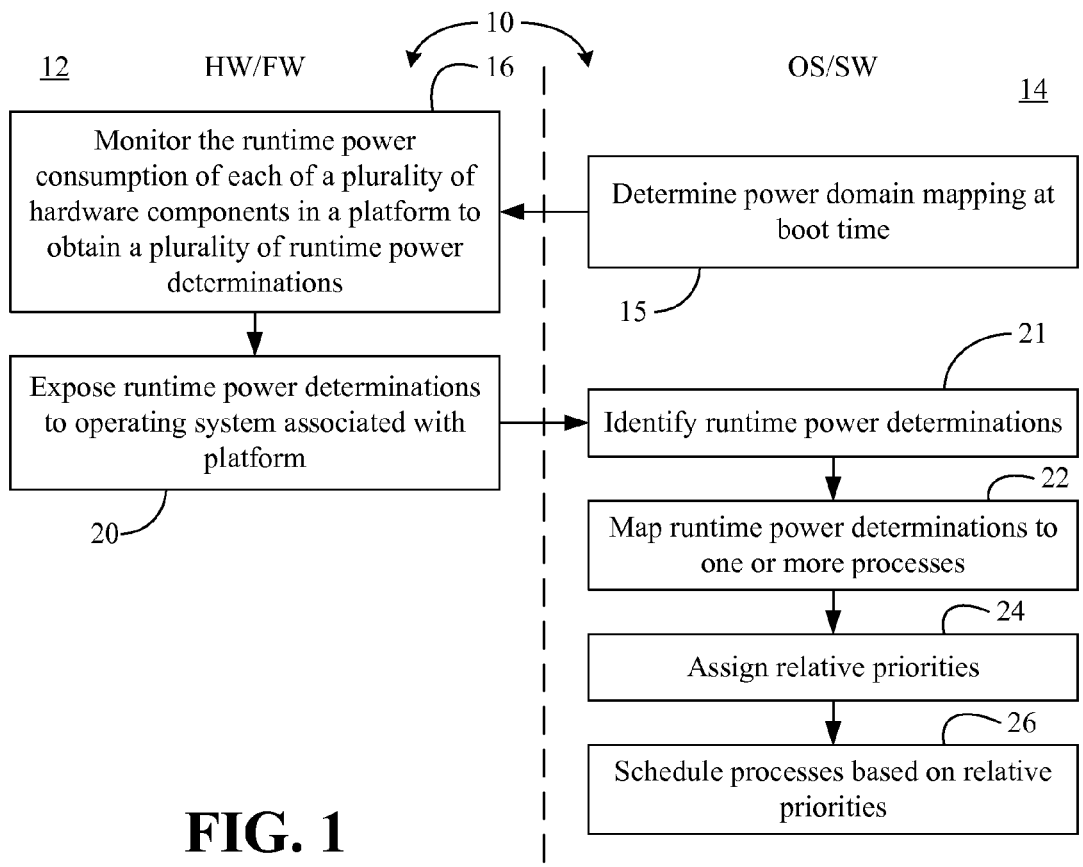
FIG. 1 is a flowchart of an example of a method of managing power in a computing platform according to an embodiment.

FIG. 1 shows a method 10 of managing power in a computing system/platform. In the illustrated example, a portion 12 of the method 10 is implemented in hardware/firmware ("HW/FW") of the computing system, and a portion 14 of method 10 is implemented in an operating system/software ("OS/SW") of the computing system. Thus, the HW/FW portion 12 might be embodied in lower-level firmware logic such as assembly language programming or machine code, in fixed-functionality logic hardware using circuit technology such as application specific integrated circuit (ASIC), complementary metal oxide semiconductor (CMOS) or transistor-transistor logic (TTL) technology, or any combination thereof.

The OS/SW portion 14, on the other hand, could be implemented in executable software of a computing system as a set of OS-related logic instructions (e.g., kernel device driver, application program interface/API, inter-processor communication/IPC instructions) stored in a machine or computer readable storage medium of a memory such as random access memory (RAM), read only memory (ROM), programmable ROM (PROM), flash memory, etc. For example, computer program code to carry out operations shown in the OS/SW portion 14 may be written in any combination of one or more programming languages, including an object oriented programming language such as Java, Smalltalk, C++ or the like and conventional procedural programming languages, such as the "C" programming language or similar programming languages.

Processing block 15 provides for determining the power domain mapping of a computing system at a boot time of the computing system (e.g., when the computing system boots up). In one example, the power domain mapping is made on a per voltage rail basis. Thus, block 15 could involve identifying a voltage rail for each hardware component/subsystem of the platform. One approach to the identification might include reading a table such as a simple firmware interface (SFI) table from a memory of the computing system at boot time. An example of a structure for such a table is shown in Table I below.

TABLE I

| Field Name | Field Offset | Field Length | Notes |
|---|---|---|---|
| INFO_TABLE_ID | 0 | 4 | Used to positively identify this table |
| TABLE_LENGTH | 4 | 4 | Length of the entire table including the header. This field can be used to determine the number of subsystem mapping blocks present. |
| REVISION | 8 | 1 | Revision number for this table |
| CHECKSUM | 9 | 1 | Entire table, including the checksum field, adds to zero in order to be considered valid. |
| DEV_INFO_BLOCK | 10 | N | An array of subsystem-to-voltage rail mappings. The number of blocks can be determined by using the TABLE_LENGTH field. |
| SUBSYS_NUM | 0 | 4 | Indicates the subsystem # |
| SUBSYS_VOLT_NUM | 2 | 4 | Indicates the voltage rail # corresponding to the above subsystem # |

The table can be used by the OS/SW to construct a hierarchical representation (e.g., tree diagram) of the platform specific power distribution. As will be discussed in greater detail, the tree diagram may also include information regarding the platform specific clock distribution. Accordingly, the platform specific power/clock distributions may be used by the OS/SW at runtime to obtain information regarding hardware component (e.g., subsystem) specific power consumption.

Block 16 provides for monitoring the runtime power consumption of each of a plurality of hardware components in a platform/computing system to obtain a plurality of runtime power determinations. The hardware components/subsystems could include processors, controllers, chipset components, programmable logic arrays (PLAs), memory chips, network chips, audio devices, multimedia devices, or other logical hardware blocks constituting a power domain from the perspective of the power delivery module of the platform. As already noted, the monitoring of runtime power consumption may be conducted on a per voltage rail basis, wherein the power consumption of each voltage rail is associated with the hardware component(s)/subsystem(s) that the particular voltage rail services.

Figure 2:
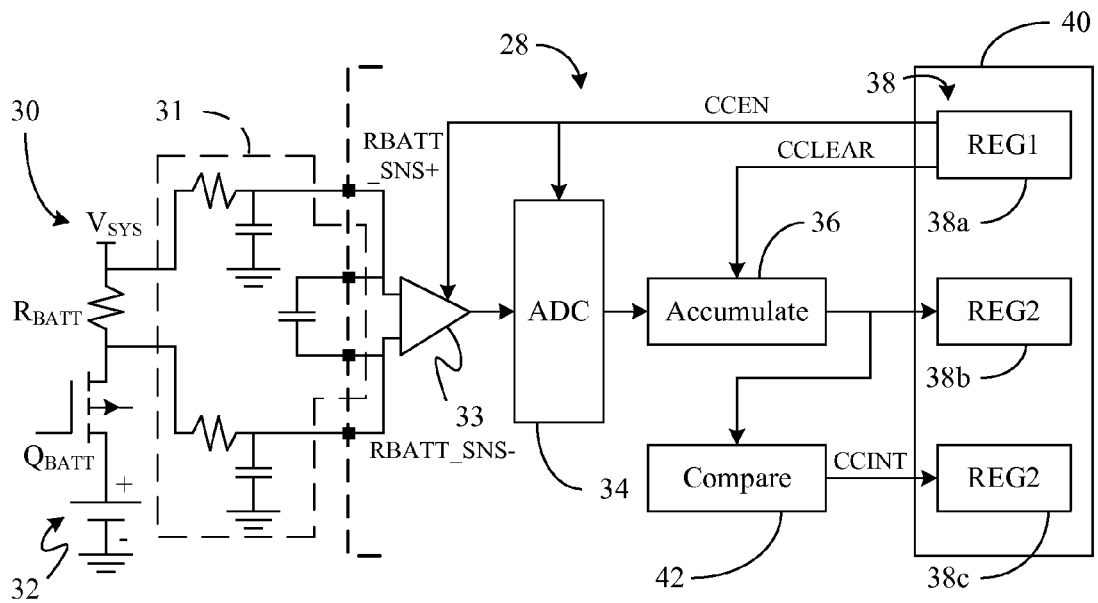
FIG. 2 is a schematic diagram of an example of a rail monitoring module according to an embodiment.

For example, FIG. 2 shows a rail monitoring module 28 that measures the runtime power draw on a voltage rail ($V_{SYS}$) provided by a battery 32. In the illustrated example, the voltage across a resistor $R_{BATT}$ ("RBATT_SNS+" and "RBATT_SNS−") is sampled by a conditioning circuit 31, amplified by an amplifier 33, and fed to a coulomb counting analog to digital converter (ADC) engine 34 to determine the current through a sensing resistor ("$R_{BATT}$") and the associated runtime power consumption for the hardware components associated with the voltage rail $V_{SYS}$. The output of the ADC engine 34 may be provided to an accumulator 36, which can accumulate the measured power drawn for a time period obtained from an interface 40 (e.g., counting clear value, "CCLEAR") to an OS associated with the platform. In one example, the interface 40 includes a set of registers 38 (38a-38c), wherein the OS or related software component may write the accumulation time period as well as other control information (e.g., coulomb counting enable value, "CCEN") to a control register 38a. The measured power drawn can be written to a result register 38b and used by a comparator 42 to write interrupt information (e.g., coulomb counting interrupt value, "CCINT") to an interrupt register 38c as appropriate.

Returning now to FIG. 1, illustrated block 20 provides for exposing the runtime power determinations to an OS associated with the platform. As already noted, the exposure of the runtime power determinations could involve the use of one or more registers 38 (FIG. 2) that are accessible either directly or indirectly by the OS. The runtime power determinations are identified by the OS/SW at illustrated block 21 based on the power domain mapping previously determined at block 15. In one example, block 21 uses the information contained in the table to collect the runtime power determinations from one or more result registers in the computing system. For example, the OS/SW portion 14 might parse through the DEV_INFO_BLOCK field array to identify the voltage rail that corresponds to an input/output (I/O) hardware block of a chipset, and read the measured power drawn from the result register corresponding to the identified voltage rail. Such a process can be repeated for each hardware component/subsystem in the computing platform to identify a plurality of runtime power determinations.

The OS/SW can read the appropriate registers either directly (e.g., via an application programming interface/API) or indirectly (e.g., via an inter-process communication/IPC protocol). For example, the power domain framework API below could be used to obtain runtime power determinations as well as to conduct power throttling.

Clock/Power Domain Framework & API getpower_info( )—get subsystem voltage rail information for a particular subsystem.

getpower( )—get power information for a particular subsystem voltage rail.

enablepower( )—enable power on a particular subsystem voltage rail.

disable power( )—disable power on a particular subsystem voltage rail.

The HW/FW portion 12 of the method 10 might also provide for identifying a clock domain in the platform for each of the plurality of hardware components to obtain a plurality of clock determinations, and exposing the plurality of clock determinations to the OS. Thus, in addition to the above power domain framework, a clock framework API such as the API below might be used to access the clock determinations and conduct clock throttling.

clk_get ( )—lookup and obtain a reference to a clock producer.

clk_enable ( )—inform the system when the clock source should be running.

clk_disable ( )—inform the system when the clock source is no longer required.

clk_set_parent ( )—set the parent clock source for this clock.

clk_get_parent ( )—get the parent clock source for this clock.

clk_get_sys ( )—get a clock based upon the device name.

IPC Interface

If there is no direct access to the result registers from the host processor, a generic inter-process communication (IPC) interface of the OS might be used to communicate with a hardware component/firmware that does have access. For example, the IPC interface framework below could be used to obtain runtime power determinations in an architecture in which the registers are contained on a power delivery mixed signal integrated circuit (MSIC) of a mobile Internet device (MID).

mid_ioread8 (u16 addr, u8 *data)—This may function read one byte of data from a specified MSIC register address.

mid_ioread16 (u32 addr, u16 *data)—This can function read two bytes of data from a specified MSIC register address. The argument passed may contain two 16 bit MSIC addresses packed in a 32 bit word.

mid_ioread32 (u64 addr)—This function could read four bytes of data from a specified MSIC register address. The argument passed can contain four 16 bit MSIC addresses packed in a 64 bit word. On success, it may fill the caller's u32 data-type with 4 bytes of data packed as u32.

mid_ioread64 (u64 addr1, u64 addr2, u64 *data)—This can function read eight bytes of data from a specified MSIC register addresses. The argument passed may contain eight 16 bit MSIC addresses packed in two 64 bit words each containing eight addresses. On success, it might fill the caller's data type with 8 bytes of data packed as u64. The first 32 bit may contain data corresponding to an address passed as the first argument and the second 32 bit data returned can correspond to an address passed as the second argument.

Thus, with the above infrastructure in place, OS components can obtain complete knowledge of which hardware component in a computing system is consuming how much power at runtime. Illustrated block 22 provides for mapping the runtime power determinations to one or more active and/or pending processes. Block 24 can assign relative priorities to the one or more processes based on the plurality of runtime power determinations, wherein the priority assignments could be made under the authorization and/or direction of a user of the computing system (e.g., in conjunction with user prompts/menus). Moreover, block 26 may schedule the one or more processes based on the relative priorities. Thus, the illustrated approach can enable the creation and implementation of application/process prioritization policies such as prioritizing email traffic over browsing, or audio playback over a background process that is synchronizing folders, based on highly granular runtime power consumption information. Moreover, the OS/SW portion 14 could conduct power and/or clock throttling activities (e.g., write throttle values to control registers) based on the runtime power determinations and clock determinations.

Figure 3:
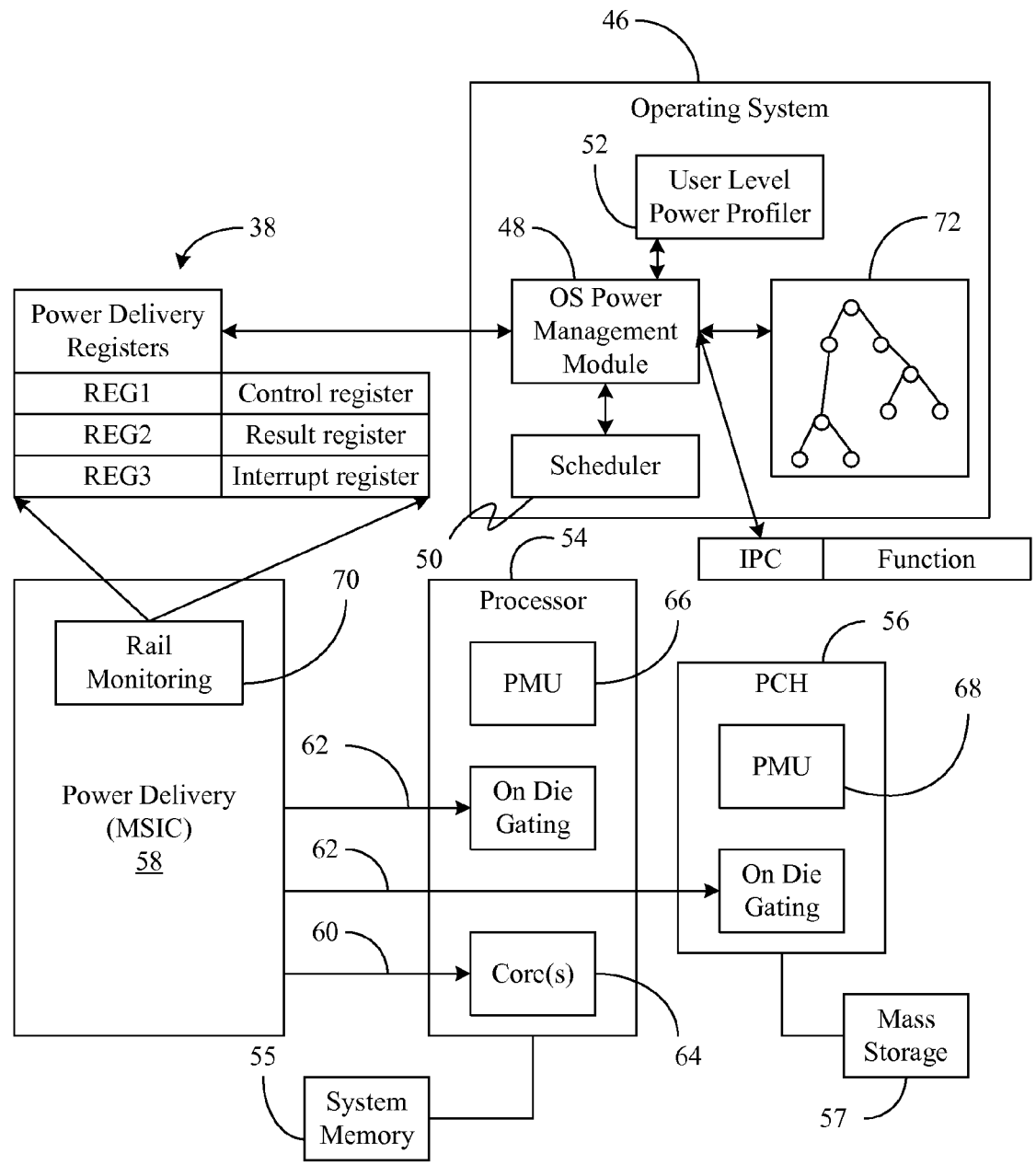
FIG. 3 is a block diagram of an example of a computing system according to an embodiment.

Turning now to FIG. 3, a computing system 44 is shown. The computing system 44 could be part of a mobile platform such as a laptop, personal digital assistant (PDA), mobile Internet device (MID), wireless smart phone, media player, imaging device, etc., or any combination thereof. The computing system 44 could alternatively include a fixed platform such as a desktop personal computer (PC) or a server. Generally, the computing system 44 may include a processor 54, system memory 55, a platform controller hub (PCH) 56, mass storage 57, and a MSIC power delivery module 58. In particular, the illustrated MSIC power delivery module 58 generates central processing unit (CPU) voltage rails 60 and external voltage rails 62. The CPU voltage rails 60 can be supplied to one or more cores 64 of the processor 54, and the external voltage rails 62 can be supplied to various other hardware blocks on the processor 54 and the PCH 56. A PMU 66 of the processor 54 may perform on die clock and/or power gating of the hardware blocks of the processor 54, whereas a PMU 68 of the PCH 56 can perform on die clock and/or power gating of the hardware blocks of the PCH 56.

In the illustrated example, the power delivery module 58 includes rail monitoring logic 70 that is configured to monitor the runtime power consumption of each of a plurality of hardware components in the computing system 44 to obtain a plurality of runtime power determinations. Thus, the rail monitoring logic 70 may include functionality such as the rail monitoring module 28 (FIG. 2), already discussed, wherein power delivery registers 38 containing the runtime power determinations can be exposed to an operating system (OS) 46 executing on the computing system 44. The power delivery registers 38 may reside anywhere within the computing system 44.

The OS 46 may be implemented as a set of logic instructions stored in a non-transitory computer readable storage medium such as the mass storage 57 for execution by the processor 54 or other system processor. The mass storage 57 may include a hard disk drive (HDD), ROM, optical disk, flash memory, etc. Execution of the OS 46 might provide for a closed telephony stack configured to support off-platform wireless communication (e.g., W-CDMA (UMTS), CDMA2000 (IS-856/IS-2000), etc.) in a mobile platform, for desktop functionality (e.g., Windows® 7) in a PC system, and so on. The illustrated OS 46 includes an OS power management module 48, a scheduler 50 and a user level power profiler 52.

At boot time, the illustrated power management module 48 reads a table that identifies a voltage rail for each hardware component in the computing system 44 and constructs a hierarchical representation (e.g., tree diagram) 72 based on the platform specific power distribution and any available information regarding the distribution of clock domains in the computing system 44. The table could be retrieved from the mass storage 57, BIOS (basic input/output system) memory (not shown) or elsewhere in the computing system 44. In addition, the power management module 48 can access the power delivery registers 38 either directly (e.g., via an API) or indirectly (e.g., via an IPC function) to identify a plurality of runtime power determinations and conduct power and/or clock throttling activities.

The power management module 48 may also map the runtime power determinations to one or more processes and inform a user of the computing system 44 of the results of the mapping operation via the user level power profiler 52. In fact, the power management module 48 and user level power profiler 52 may enable a substantially more robust and intelligent "battery monitor" functionality that provides the user with a more granular level of information (e.g., power consumption per component, per process, per application). In response to the user input through the power profiler 52 (or based solely on the runtime power determinations without user input), the power management module 48 can assign relative priorities to the various processes, and use the scheduler 50 to schedule the processes based on the relative priorities. Thus, process scheduling at the OS level can take on an additional dimension—power awareness. For example, processes that account for lesser CPU/resource time might be rewarded for being power efficient, and the scheduler 50 may take these rewards/bonus points into account when it is scheduling tasks for processors.

Embodiments described herein are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
    monitoring a runtime power consumption of two or more processors in a platform to obtain a plurality of runtime power determinations for each of the two or more processors;
    exposing two or more runtime power determinations of the plurality of runtime power determinations for each of the two or more processors to a user level power profiler, wherein the user level power profiler informs a user of an accumulation of runtime power consumption per processor over a time period via the two or more runtime power determinations of the plurality of runtime power determinations for each of the two or more processors to provide a profile of transient power at each of the two or more processors over the time period;
    measuring power drawn from a voltage rail of the platform;
    writing the measured power drawn to a result register entry corresponding to a hardware component coupled to the voltage rail; and
    controlling the voltage rail based on a throttle value of a control register.

2. The method of claim 1, wherein for one or more of the plurality of runtime power determinations, monitoring the runtime power consumption includes:
    measuring power drawn from the voltage rail of the platform, wherein the voltage rail is associated with a battery; and
    writing the measured power drawn to the result register entry corresponding to the hardware component coupled to the voltage rail.

3. The method of claim 1, further including:
    identifying a clock domain in the platform for two or more processors to obtain a plurality of clock determinations; and
    exposing one or more of the plurality of clock determinations to an operating system.

4. An apparatus comprising:
    two or more processors;
    logic, implemented at least partly in one or more of configurable logic or fixed functionality logic hardware, to:
        monitor a runtime power consumption of the two or more processors in a platform to obtain a plurality of runtime power determinations for each of the two or more processors;
        expose two or more runtime power determinations of the plurality of runtime power determinations for each of the two or more processors to a user level power profiler, wherein the user level power profiler is to inform a user of an accumulation of runtime power consumption per processor over a time period via the two or more runtime power determinations of the plurality of runtime power determinations for each of the two or more processors to provide a profile of transient power at each of the two or more processors over the time period;
        measure power drawn from a voltage rail of the platform;
        write the measured power drawn to a result register entry corresponding to a hardware component coupled to the voltage rail; and
        control the voltage rail based on a throttle value of a control register.

5. The apparatus of claim 4, wherein for one or more of the plurality of runtime power determinations, to monitor the runtime power consumption is to include:
    a measurement of power drawn from the voltage rail of the platform, wherein the voltage rail is associated with a battery; and
    a write of the measured power drawn to the result register entry corresponding to the hardware component coupled to the voltage rail.

6. The apparatus of claim 4, wherein the logic is further to:
    identify a clock domain in the platform for two or more processors to obtain a plurality of clock determinations; and expose one or more of the plurality of clock determinations to an operating system.

7. The apparatus of claim 4, wherein the logic is further to map one or more of the plurality of runtime power determinations to one or more processes to inform the user via the user level power profiler of runtime power consumption per process.

8. The apparatus of claim 4, wherein the logic is further to map one or more of the plurality of runtime power determinations to one or more applications to inform the user via the user level power profiler of runtime power consumption per application.

9. The apparatus of claim 4, wherein the platform is to include a mobile platform.

10. A non-transitory computer readable storage medium comprising a set of instructions which, if executed by a processor, cause a computer to:
   monitor a runtime power consumption of two or more processors in a platform to obtain a plurality of runtime power determinations for each of the two or more processors;
   expose two or more runtime power determinations of the plurality of runtime power determinations for each of the two or more processors to a user level power profiler, wherein the user level power profiler is to inform a user of an accumulation of runtime power consumption per processor over a time period via the two or more runtime power determinations of the plurality of runtime power determinations for each of the two or more processors to provide a profile of transient power at each of the two or more processors over the time period;
   measure power drawn from a voltage rail of the platform;
   write the measured power drawn to a result register entry corresponding to a hardware component coupled to the voltage rail; and
   control the voltage rail based on a throttle value of a control register.

11. The medium of claim 10, wherein for one or more of the plurality of runtime power determinations, to monitor the runtime power consumption is to include:
   a measurement of power drawn from the voltage rail of the platform, wherein the voltage rail is associated with a battery; and
   a write of the measured power drawn to the result register entry corresponding to the hardware component coupled to the voltage rail.

12. The medium of claim 10, wherein the instructions, if executed, further cause a computer to:
   identify a clock domain in the platform for two or more processors to obtain a plurality of clock determinations; and
   expose one or more of the plurality of clock determinations to an operating system.

13. The medium of claim 10, wherein the instructions, if executed, further cause a computer to map one or more of the plurality of runtime power determinations to one or more processes to inform the user via the user level power profiler of runtime power consumption per process.

14. The medium of claim 10, wherein the instructions, if executed, further cause a computer to map one or more of the plurality of runtime power determinations to one or more applications to inform the user via the user level power profiler of runtime power consumption per application.

\* \* \* \* \*